(12) United States Patent
Nakagawa et al.

(10) Patent No.: US 6,772,982 B2
(45) Date of Patent: Aug. 10, 2004

(54) MOUNTING STRUCTURE

(75) Inventors: Nobuya Nakagawa, Aichi-ken (JP); Yoshihiro Hashizume, Aichi-ken (JP); Fumikazu Muramatsu, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/252,539

(22) Filed: Sep. 24, 2002

(65) Prior Publication Data

US 2003/0062456 A1 Apr. 3, 2003

(30) Foreign Application Priority Data

Sep. 28, 2001 (JP) ....................................... 2001-298874

(51) Int. Cl.$^7$ ................................................ F24H 9/06
(52) U.S. Cl. ...................... 248/232; 248/201; 248/233
(58) Field of Search ......................... 403/49, 345, 353, 403/384; 248/222.51, 200, 200.1, 201, 232, 233, 234; 165/67

(56) References Cited

U.S. PATENT DOCUMENTS

| | | | | |
|---|---|---|---|---|
| 1,827,540 A | * | 10/1931 | O'Connell | |
| 3,330,518 A | * | 7/1967 | Adler | 248/223 |
| 4,071,218 A | * | 1/1978 | Pecka et al. | 248/221.4 |
| 4,133,507 A | * | 1/1979 | Chervenak | 248/225.2 |
| 4,165,852 A | * | 8/1979 | Chervenak | 248/225.2 |
| 4,218,028 A | * | 8/1980 | Pickens | 242/55.2 |
| 5,607,133 A | * | 3/1997 | Markham et al. | 248/313 |
| 5,657,817 A | * | 8/1997 | Heine et al. | 165/67 |
| 6,158,500 A | * | 12/2000 | Heine | 165/67 |
| 6,199,622 B1 | * | 3/2001 | Mashio et al. | 165/67 |
| 6,315,257 B1 | * | 11/2001 | Fennesz | 248/232 |
| 6,364,262 B1 | * | 4/2002 | Gibson et al. | 248/229.14 |
| 6,571,898 B2 | * | 6/2003 | Guyomard | 180/68.4 |
| 6,616,109 B1 | * | 9/2003 | Jarrett et al. | 248/201 |

FOREIGN PATENT DOCUMENTS

| | | |
|---|---|---|
| EP | 0053578 | 6/1982 |
| FR | 2738308 | 3/1997 |

* cited by examiner

*Primary Examiner*—Leslie A. Braun
*Assistant Examiner*—Steven Marsh
(74) *Attorney, Agent, or Firm*—Wenderoth, Lind & Ponack, L.L.P.

(57) ABSTRACT

A mounting structure of the present invention for connecting a first member and a second member to each other comprises first bracket means attached to said first and second members and fastened together by means of a bolt and nut. The mounting structure further comprises second bracket means attached to said first and second members below said first bracket means. The second bracket means includes a first abutment member attached to one of said first and second members and having a vertical wall portion. The second bracket means further includes a second abutment member attached to the other of said first and second members and having first and second abutment portions vertically and horizontally spaced from each other.

3 Claims, 5 Drawing Sheets

MOUNTING STRUCTURE

BACKGROUND OF THE INVENTION

1. Field of the Invention

The present invention generally relates to a mounting structure for connecting two members to each other, and in particular, a mounting structure for mounting a condenser of an air-conditioning system for a vehicle or a fan shroud having a powered fan on a radiator of a cooling system for a vehicle.

2. Description of the Related Art

A car manufacturer finally assembling parts of a vehicle sometimes requests parts suppliers to deliver parts associated with each other in the form of an assembly or a functional unit, that is, to modularize the parts or components, in order to improve efficiency of the assembly by the car manufacturer.

Thus, in view of this need for modularization, the parts supplier is often required to deliver, for example, a radiator of a cooling system for a vehicle in a condition in which a condenser of an air-conditioning system for a vehicle and a fan shroud having a powered fan have already been attached to the radiator.

Mounting of the condenser and the fan shroud on the radiator is typically performed by inserting bolts through mounting holes directly formed in respective upper portions of the radiator, the condenser and the fan shroud or mounting holes of brackets attached thereto, and then fastening nuts on the bolts.

On the other hand, in order to mount lower portions of the condenser and the fan shroud on that of the radiator, fitting means are used instead of the bolts and nuts, since these components including the radiator are disposed in an engine room having a limited space. Once they have been set therein, it is difficult to access them by hand to perform maintenance work thereon.

It is known that, for example, two brackets each having an upwardly opened receiving recess are attached to a lower portion of the radiator or upwardly opened receiving recesses are integrally formed with the lower portion of the radiator. Two insert engagement portions attached to the respective lower portions of the condenser and the fan shroud or formed integrally therewith are fitted into the receiving recesses of the radiator. It is also known that in fitting the insert engagement portion into the receiving recess, a so called springback can be utilized.

Upon inserting the engagement portions of the condenser and the fan shroud into the receiving recesses of the radiator described above, in either of the case where the insert engagement portions of the condenser and the fan shroud are fitted into the upwardly receiving recesses of the radiator and the springback is utilized to do so, or the case where the springback is not utilized to do so, the receiving recess and the insert engagement portion are required to have strict dimensional accuracy in order to prevent a rattling of the radiator, the condenser and the fan shroud which may be caused by a vibration input into the vehicle.

Additionally, when the insert engagement portions of the condenser and the fan shroud are fitted into the lower receiving recesses of the radiator, the condenser and the fan shroud are tilted relative to the radiator so that the other portions of the radiator, the condenser and the fan shroud are prevented from interfering with each other. However, it is difficult for the insert engagement portions to be accurately positioned relative to the receiving recesses and for the former to be accurately fitted into the latter (in particular, the former have to be accurately press-fitted into the latter so as to obtain the springback), because a section of the insert engagement portion is a simple rectangularity and a section of the receiving recess merely corresponds thereto.

SUMMARY OF THE INVENTION

It is therefore an object of the present invention to provide a mounting structure capable of easily positioning one component thereof relative to the other component, and a mounting structure capable of easily positioning one component thereof relative to another component without these components having to be accurately dimensioned.

The present invention achieves this object by providing a mounting structure for connecting a first member and a second member to each other. The mounting structure comprises first bracket means attached to the first and second members and fastened together by means of a bolt and nut. The first bracket means include upper brackets attached to the first and second member, respectively. Each of the upper brackets is formed with a mounting hole through which the bolt is extended. The mounting structure further comprises second bracket means attached to the first and second members below the first bracket means. The second bracket means include a first abutment member attached to one of the first and second members and having a vertical wall portion. The second bracket means further include a second abutment member attached to the other of the first and second members and having first and second abutment portions vertically and horizontally spaced from each other. The second abutment member supports the vertical wall portion of the first abutment member from a bottom thereof as well as from the opposite sides of the vertical wall portion by means of the first and second abutment portions when the upper brackets are fastened together by the bolt and nut. The second abutment portion is disposed farther from the other member than the first abutment portion and below the first abutment portion and a region of the second abutment member below the first abutment portion is cut off away from the second abutment portion.

In accordance with the mounting structure of the present invention, the vertical wall portion of the one member can be easily inserted into the cut-off portion below the first abutment portion of the other member by tilting the one member relative to the other member. Then, the one member can be rotated relative to the other member around the lower portion of the vertical wall portion while the vertical wall portion is supported on the second abutment member. Subsequently, the mounting holes of the upper brackets of the first and second members are aligned with each other, the bolt is extended through the aligned mounting holes and the nut is threadedly engaged with the bolt to fasten the upper brackets together.

The present invention also achieves the object mentioned above by providing a mounting structure for connecting a first member and a second member to each other. The mounting structure comprises first bracket means attached to the first and second members and fastened together by means of a bolt and nut. The first bracket means includes upper brackets attached to the first and second members, respectively. Each of the upper brackets is formed with a mounting hole through which the bolt is extended. The mounting structure further comprises second bracket means attached to the first and second members below the first bracket means. The second bracket means includes a first mounting member attached to one of the first and second members and having a wedge-shaped engaging portion. The second bracket means further includes a second mounting member attached to the other of the first and second members and having an upwardly opened recess complementary to the wedge-shaped engaging portion of the first mounting member for receiving this portion.

In accordance with this mounting structure of the present invention, insertion of the wedge-shaped engaging portions of the one member into the upwardly opened recesses of the other member, namely, positioning of the former relative to the latter can be easily carried out, because the upper opening portion of each of the upwardly opened recesses is wider than the thickness of the bottom portion of each of the wedge-shaped engaging portions converging downwardly. Additionally, a so-called wedge effect causes the dimensional accuracy with respect to the engaging portion and the recess, which are required to have strict dimensional accuracy, to be relatively deteriorated.

Further, in this second mounting structure, it is preferable that the mounting hole of each of the upper brackets be vertically expanded.

DETAILED DESCRIPTION

Preferred embodiments of the present invention will be described in detail with reference to the attached drawings. In these embodiments, the present invention is applied to a mounting structure between a radiator and a condenser of a vehicle and to another mounting structure between the radiator and a fan shroud of the vehicle.

First of all, a mounting structure between a radiator and a condenser of a vehicle will be described with reference to FIGS. 1 to 4.

Figure 1:
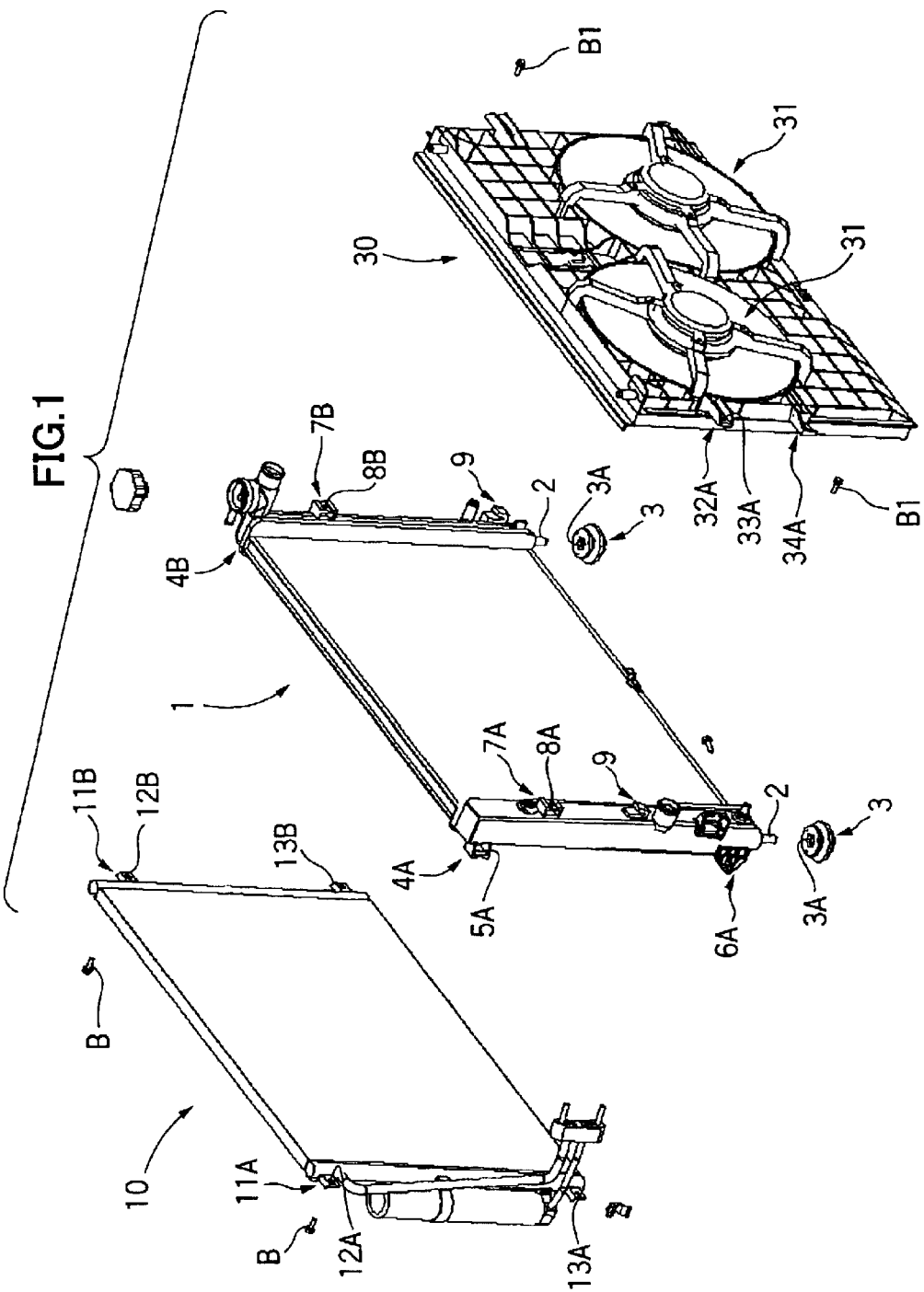
FIG. 1 is an exploded perspective view of a radiator, a condenser and a fan shroud equipped with a mounting structure according to the present invention.

FIG. 1 is an exploded perspective view of a radiator, a condenser and a fan shroud of the vehicle when viewed from a backside thereof.

In these figures, a radiator of a cooling system for a vehicle is generally designated by a reference numeral 1. The radiator 1 comprises a pair of mounting rods 2 extending downwardly from lateral end portions of a lower portion of the radiator 1 and are held in receiving holes 3A of holding members 3 attached to a vehicle body, respectively. An upper portion of the radiator 1 is supported by core supports or upper holding members (not shown) extending in a width direction of the vehicle and fixed to the vehicle body.

A condenser generally designated by a reference numeral 10, which is a component of an air-conditioning system for a vehicle, is adapted to be attached to the radiator 1 through a mounting structure according to a first embodiment of the present invention.

This mounting structure comprises first bracket means attached to the radiator 1 and the condenser 10, respectively, which are able to be connected to each other by means of a bolt and nut.

In the present embodiment, these first bracket means consist of a pair of upper brackets 4A and 4B attached to the radiator 1 and another pair of upper brackets 11A and 11B attached to the condenser 10. The upper brackets 4A, 4B and 11A, 11B extend outwardly from upper sides of the radiator 1 and the condenser 10, respectively, and are formed with mounting holes 5A, 5B (not shown) and 12A, 12B, respectively, through each of which a bolt B is inserted.

The mounting structure further comprises second bracket means attached to the radiator 1 and the condenser 10 below the first bracket means.

Figure 3:
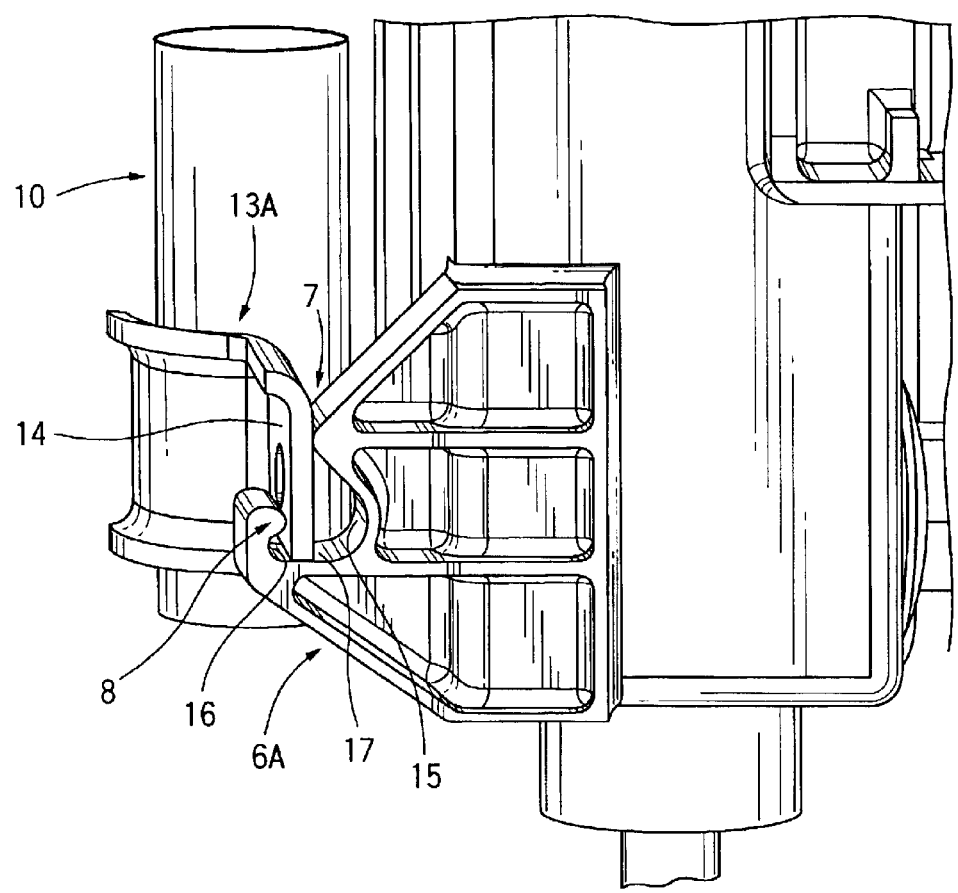
FIG. 3 is a schematic, partially enlarged view illustrating a state in which the condenser has been mounted on the radiator shown in FIG. 1.

In the present embodiment, the second bracket means includes first abutment members, namely, a pair of lower brackets 13A and 13B attached to the condenser 10 below the upper brackets 11A and 11B. The lower brackets 13A and 13B extend outwardly from both sides of the condenser 10 and, as best seen in FIG. 3, they each have a vertical wall 14 extending substantially in a vertical direction when the condenser 10 is mounted on the radiator 1.

The second bracket means further includes second abutment members, namely, a pair of lower brackets 6A and 6B (not shown) attached to the radiator 1 below the upper brackets 4A and 4B. Since the lower bracket 6A and the lower bracket 6B (not shown) have the same structure, only the lower bracket 6A will be described hereafter.

The lower bracket 6A projects from the side of the radiator 1 outwardly and forwardly (namely, toward the condenser 10) and has a first abutment portion 7 and a second abutment portion 8 vertically and horizontally spaced from each other. As best seen in FIG. 3, the first and second abutment portions 7 and 8 are adapted to support the vertical wall 14 of the lower bracket 13A on the opposite sides thereof, namely, the front and rear sides thereof, when a bolt (B) is inserted through the mounting hole 5A of the upper bracket 4A of the radiator 1 and the mounting hole 12A of the upper bracket 11A of the condenser 10. Another bolt (B) is inserted through the mounting hole 5B of the upper bracket 4B of the radiator 1 and the mounting hole 12B of the upper bracket 11B of the condenser 10 and then nuts are threadedly engaged with the bolts (B), respectively, so that the upper bracket 4A and the upper bracket 11A as well as the upper bracket 4B and the upper bracket 11B are fastened to each other.

The first abutment portion 7 of the lower bracket 6A (namely, the second abutment member) is located upwardly and rearwardly with respect to the second abutment portion 8. A portion of the lower bracket 6A positioned in a region below the first abutment portion 7 is cut off away from the second abutment portion 8 (namely, rearwardly) so as to form a first cut-off portion 15. A portion of the lower bracket 6A positioned in a region below the second abutment portion 8 is also cut off away from the first abutment portion 7 (namely, frontwardly) so as to form a second cut-off portion 16. The first cut-off portion 15 and the second cut-off portion 16 merge with each other below the first and second abutment portions 7 and 8 to form a lower support portion 17 for supporting the vertical wall 14 of the lower bracket 13A from its bottom.

Figure 2:
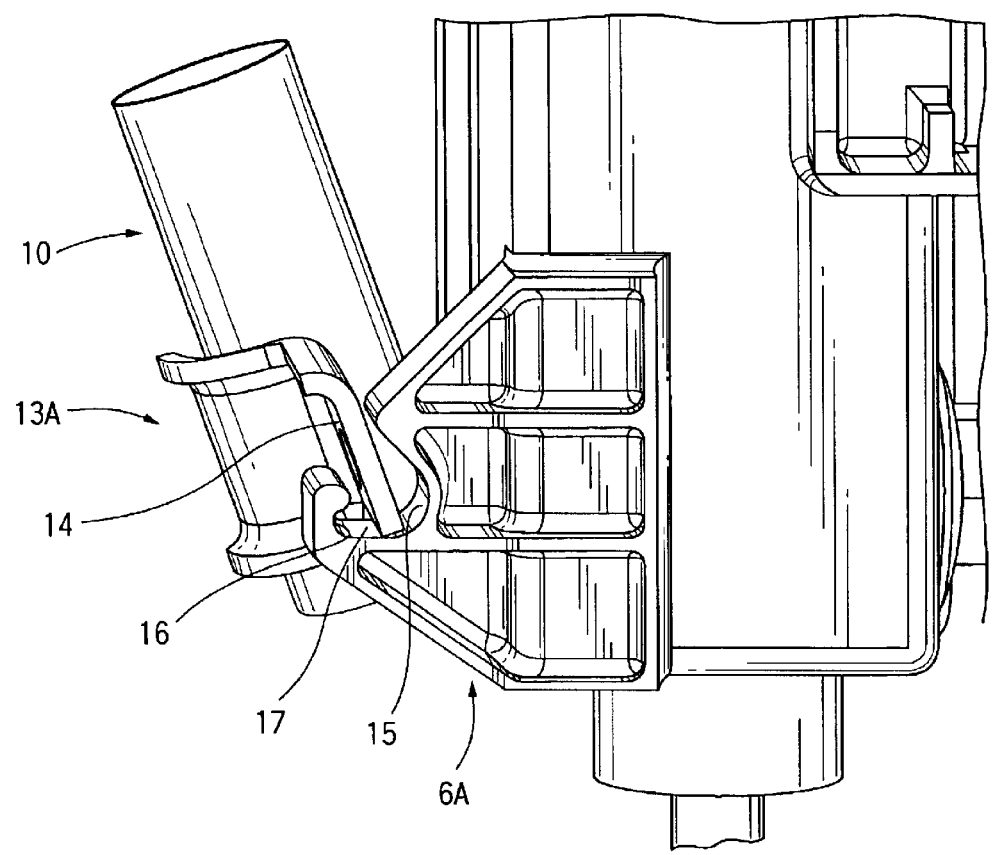
FIG. 2 is a schematic, partially enlarged view illustrating a state in which the condenser is being mounted on the radiator shown in FIG. 1.

In the mounting structure described above, in order to mount the condenser 10 on the radiator 1 of the vehicle, as shown in FIG. 2, the condenser 10 is forwardly and downwardly inclined with respect to the radiator 1 and the vertical wall 14 of the lower bracket 13A of the condenser 10 is then inserted into the lower support portion 17 of the lower bracket 6A of the radiator 1. It is easy to insert the lower bracket 13A into the lower bracket 6A, namely, to position the former relative to the latter, because the lower bracket 6A is formed with the first cut-off portion 15 in which the vertical wall 14 of the lower bracket 13A of the inclined condenser 10 can be easily received.

Then, the condenser 10 is rotated around the vertical wall 14 of the lower bracket 13A (of the condenser 10) in the first cut-off portion 15 of the lower bracket 6A so that the condenser 10 becomes parallel to the radiator 1, as shown in FIG. 3.

Finally, the mounting hole 5A of the upper bracket 4A of the radiator 1 and the mounting hole 12A of the upper bracket 11A of the condenser 10 are aligned with each other, the mounting hole 5B of the upper bracket 4B of the radiator 1 and the mounting hole 12B of the upper bracket 11B of the condenser 10 are aligned with each other, the bolts (B) are inserted through the aligned mounting holes, respectively, and the nuts (not shown) are threadedly engaged with the bolts (B), respectively, so that the upper brackets 4A and 4B and the upper brackets 11A and 11B are fastened to each other, respectively.

When the upper portion of the condenser 10 is inclined rearwardly relative to the lower portion thereof by tightly fastening the bolts and nuts in the way described above, the condenser 10 is firmly attached to the radiator 1 at three points: a fastened point of the bolt and nut, abutment points between the vertical walls 14 and the abutment portions 7, and other abutment points between the vertical walls 14 and the abutment portions 8.

Alternatively, a lower bracket having the same structure as the lower bracket 13A, namely, a structure which is a mirror image of the lower bracket 13A, may be attached to the radiator 1 and a lower bracket having the same structure as the lower bracket 6A, namely, a structure which is a mirror image of the lower bracket 6A, may be attached to the condenser 10. With this embodiment, the radiator 1 is mounted on the condenser 10 by tilting rearwardly the radiator 1 relative to the condenser 10 and inserting the vertical wall of the lower bracket of the radiator 1 into the lower support portion of the lower bracket of the condenser 10.

Figure 4:
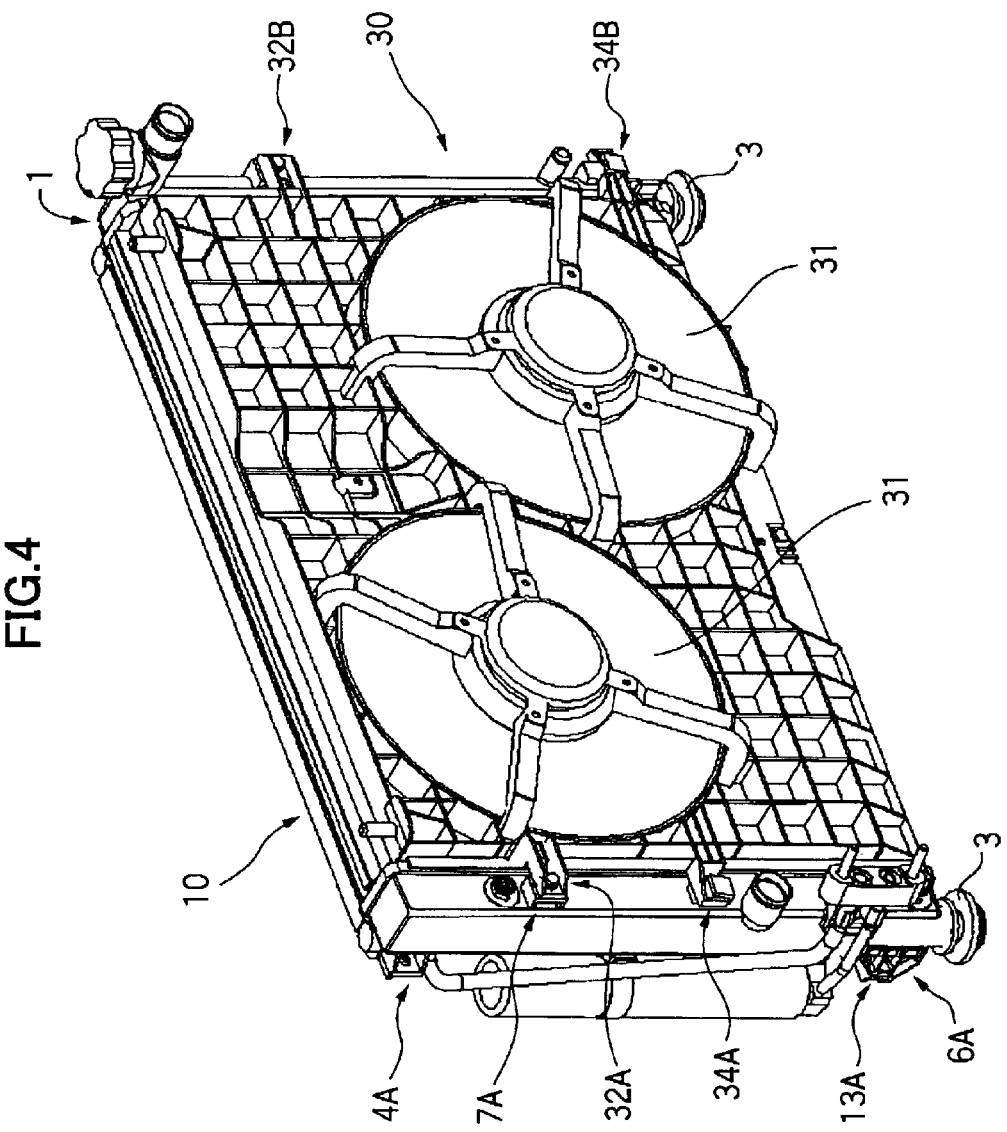
FIG. 4 is a schematic perspective view illustrating a state in which the radiator, the condenser and the fan shroud shown in FIG. 1, have been assembled.
Figure 5A:
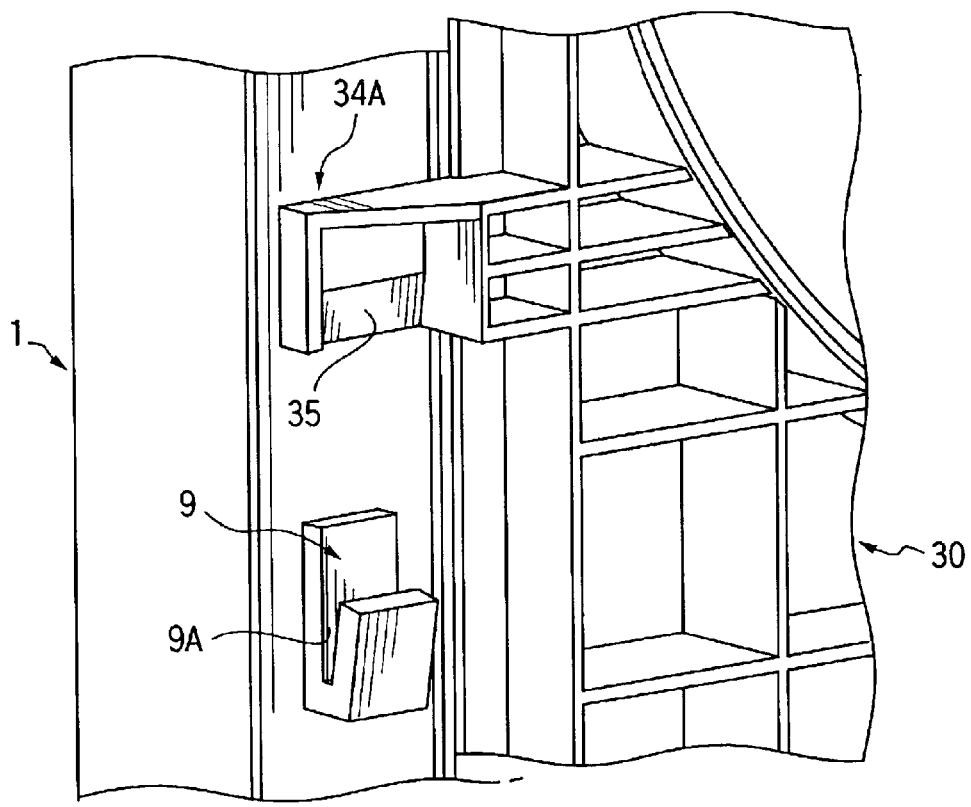
FIG. 5A is a schematic, partially enlarged view illustrating a state in which the fan shroud is being mounted on the radiator shown in FIG. 1
Figure 5B:
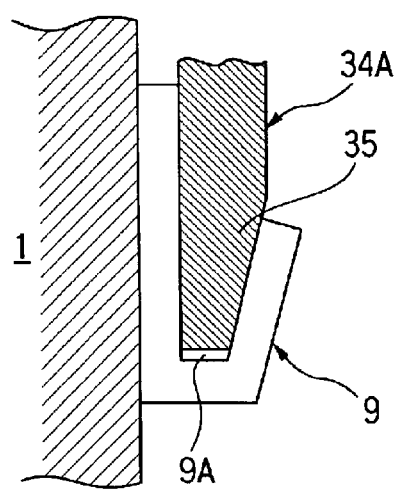
FIG. 5B is a schematic, partially enlarged sectional view illustrating a state in which the fan shroud has been mounted on the radiator shown in FIG. 1.

Now, referring to FIGS. 1, 4 and 5, a mounting structure between the radiator 1 mentioned above and a fan shroud will be described.

In FIG. 1, a fan shroud with a powered fan 31 for cooling the radiator 1 is generally indicated by a reference numeral 30. This fan shroud 30 is mounted on the radiator 1 of FIG. 1 through a mounting structure according to a second embodiment of the present invention.

This mounting structure comprises third bracket means attached to the radiator 1 and the fan shroud 30, respectively, which are able to be connected to each other by means of bolt and nut.

In the present embodiment, these third bracket means consist of a pair of upper brackets 7A and 7B attached to the radiator 1 and a pair of upper brackets 32A and 32B (FIG. 4) attached to the fan shroud 30. The upper brackets 4A, 4B and 11A, 11B outwardly extend from sides of upper portions of the radiator 1 and the fan shroud 30, respectively, and are formed with mounting holes 8A, 8B and 33A, 33B (not shown), respectively, through which bolt (B1) is inserted.

The mounting structure further comprises fourth bracket means attached to the radiator 1 and the fan shroud 30 below the third bracket means.

In this embodiment, the fourth bracket means includes second lower brackets, namely, a pair of first mounting members 34A and 34B (see FIG. 4) attached to the fan shroud 30 below the upper bracket 32A and 32B. Each of the first mounting members 34A and 34B outwardly extends from one of the sides of the fan shroud 30 and as best seen in FIG. 5A, is provided at its lower portion with a wedge-shaped engaging portion 35 which converges downwardly.

The fourth bracket means further includes a pair of second mounting members 9 and 9 attached to the radiator 1 below the second upper brackets 7A and 7B. Each of the second mounting members 9 rearwardly extends from the side of the radiator 1 and, as best seen from FIG. 5A, is provided with an upwardly opened recess 9A which is complementary to the wedge-shaped engaging portion 35 of the first mounting member 34.

In the mounting structure described above, in order to mount the fan shroud 30 on the radiator 1 of the vehicle, as shown in 5A, the wedge-shaped engaging portions 35 of the first mounting members 34A and 34B of the fan shroud 30 are inserted into the upwardly opened recesses 9A of the second mounting members 9, 9 of the radiator 1, respectively. Insertion of the wedge-shaped engaging portions 35 into the second mounting members 9, namely, positioning of the former relative to the latter, can be easily carried out, because the upper opening portion of each of the recesses 9A is wider than the thickness of the bottom portion of each of the wedge-shaped engaging portions 35 converging downwardly. Additionally, since the wedge-shaped engaging portion 35 is guided by and received in the complementary recess 9A, the wedge-shaped engaging portion 35 can be easily introduced into the recess 9A to a desired depth thereof. In this connection, a so-called wedge effect causes the dimensional accuracy with respect to the engaging portion 35 and the recess 9A, which are required to have strict dimensional accuracy, to be relatively deteriorated. Correspondingly, if the dimensional accuracy of the engaging portion 35 and the recess 9A is relatively deteriorated, the mounting holes 8A, 8B, 33A and 33B (not shown) must be vertically expanded.

After the wedge-shaped engaging portions 35 are engaged with the recesses 9A, the mounting holes 33A and 33B (not shown) of the second upper brackets 32A and 32B (not shown) of the fan shroud 30 are aligned with the mounting holes 8A and 8B of the second upper brackets 7A and 7B of the radiator 1, respectively, the bolts (B1) are inserted through the respective aligned holes, and the nuts (not shown) are threadedly engaged with the bolts (B1) so that the second upper brackets 7A and 7B of the radiator 1 and the second upper brackets 32A and 32B (not shown) of the fan shroud 30 are firmly connected to each other, respectively.

Alternatively, a second mounting member having the same structure as the first mounting member 34 with the wedge-shaped engaging portion 35 of the fan shroud 30, namely, a structure which is a mirror image of the first mounting member 34, may be attached to the radiator 1 and a first mounting member having the same structure as the second mounting member 9 with the wedge-shaped engaging recess 9A, namely, a structure which is a mirror image of the second mounting member 9 may be attached to the fan shroud 30.

Although the present invention has been described with reference to specific, preferred embodiments, those skilled in the art will recognize that various modifications and improvements can be made while remaining within the scope and spirit of the present invention. The scope of the present invention is determined solely by the appended claims.

For example, the mounting structure of the first embodiment may be used to connect the radiator 1 and the fan shroud 30 to each other, and the mounting structure of the second embodiment may be used to connect the radiator 1 and the condenser 10 to each other.

Further, in the embodiments mentioned above, although, for example, the upper bracket 4A of the radiator 1 and the upper bracket 11A of the condenser 10 are directly fastened by means of a bolt and nut, a washer member or protector may be attached to the upper brackets 4A and 11A for the purpose of preventing the bolt and nut from being loosened due to vibration or protecting the upper brackets 4A and 11A. For example, this protector may have a substantially U-shaped section and include a pair of opposed plates positioned on the outer surfaces of the upper brackets 4A and 11A and formed with holes, respectively. In this embodiment, the bolt is extended through the holes 5A and 12A of the upper brackets 4A and 11A and the holes of the protector.

Furthermore, although in the embodiments mentioned above, different bolts (B) and (B1) are used to fasten the radiator 1 and the condenser 10 and the radiator 1 and the fan shroud 30, respectively, a single bolt may be extended through the radiator 1, the condenser 10 and the fan shroud 30 to fasten them together.

What is claimed is:

1. A mounting structure for connecting a first member and a second member to each other, said mounting structure comprising:

a first bracket arrangement that is attached to said first and second members and fastened together by a bolt and nut, including upper brackets attached to said first and second members, respectively, and said upper brackets each having a mounting hole through which said bolt extends; and a second bracket arrangement attached to said first and second members below said first bracket arrangement, said second bracket arrangement including:

a first abutment member attached to one of said first and second members and having a vertical wall portion; and a second abutment member attached to the other of said first and second members and having first and second abutment portions that are vertically and horizontally spaced from each other, said second abutment member supporting said vertical wall portion of said first abutment member from a bottom thereof as well as from opposite sides thereof by said first and second abutment portions when said upper brackets are fastened together by said bolt and nut, said second abutment portion being disposed farther from said other of said first and second members than said first abutment portion and below said first abutment portion, and a region of said second abutment member below said first abutment portion being cut off away from said second abutment portion;

wherein said second abutment member is formed so that said vertical wall portion of said first abutment member can be inserted into said cut-off portion between said first and second abutment portions of said second abutment member in a state in which said vertical wall portion is tilted relative to said second member, and then can be pivoted to abut against said first and second abutment portions.

2. The mounting structure of claim 1, wherein the one of said first member and said second member comprises a vehicle radiator.

3. The mounting structure of claim 2, wherein the other of said first member and said second member comprises a condenser.

* * * * *